UNITED STATES PATENT OFFICE.

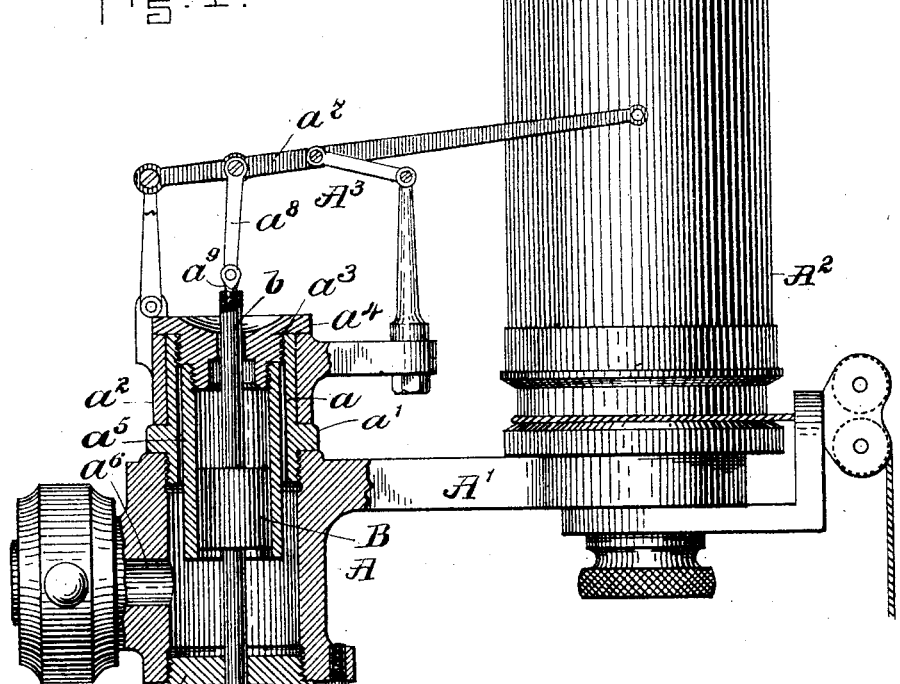
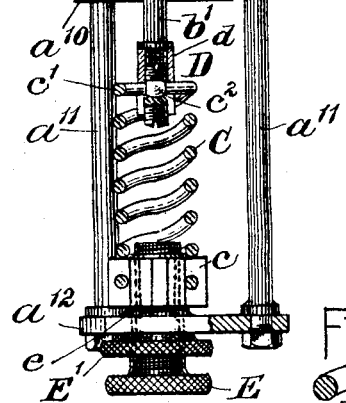
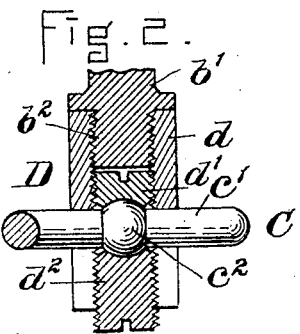
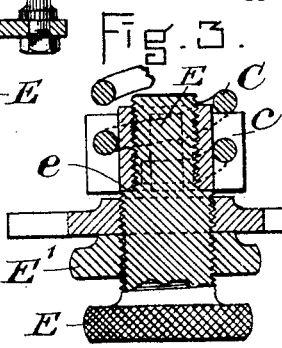

CHARLES B. BOSWORTH, OF SOMERVILLE, MASSACHUSETTS, ASSIGNOR TO CORINNE M. CLEVELAND, OF NEWTON, MASSACHUSETTS.

STEAM-ENGINE INDICATOR.

No. 798,490.     Specification of Letters Patent.     Patented Aug. 29, 1905.

Application filed May 28, 1904. Serial No. 210,301.

*To all whom it may concern:*

Be it known that I, CHARLES B. BOSWORTH, a citizen of the United States, and a resident of Somerville, in the county of Middlesex and State of Massachusetts, have invented a new and useful Improvement in Steam-Engine Indicators, of which the following is a full, clear, and exact description, reference being had to the accompanying drawings, forming a part of this specification, in explaining its nature.

My invention relates to an improvement in steam-engine indicators of a kind in which the spring is removed from and combines with the rod of the piston outside the cylinder or steam-chamber and of the kind also in which the spring is drawn out instead of compressed by the piston.

The object of my invention is to make an indicator of the character above expressed which will be as simple as possible in its construction, in which the parts can be easily put together or taken apart, either in whole or in part, by which means any part or portion of the indicator can be removed without disturbing the rest, in which kind of indicator also an improved means is provided for effecting the adjustment of the pencil-movement, by which means the said movement may be adjusted at any time after the indicator has been combined with the engine and the adjustment be effected entirely by hand, which indicator is provided also with an improved means for combining the spring with the piston-rod, this, together with other improved features, all of which can best be seen and understood in connection with the drawings, forming a part of this specification, in which—

Figure 1 shows the indicator embodying the features of my invention, the portions to which it relates being shown mainly in cross vertical section. Figs. 2 and 3 show in cross vertical section details thereof, to which special reference will hereinafter be made.

Referring to the drawings, A represents a cylindrical casing. From its side near the top there extends the plate A', upon which is mounted a drum $A^2$. Into the upper end of the casing A there is threaded a tubular extension $a$, having an annular flange or shoulder $a'$, which becomes seated when in place against the top edge of the casing. Around this tubular extension and resting upon its annular flange $a'$ there fits a sleeve $a^2$, to which is attached by suitable connecting-arms the usual pencil-movement $A^3$.

The casing A and its tubular extension $a$ form the steam-chamber. The upper end of the steam-chamber is closed by the head or cap $a^3$, which screws into the interiorly-threaded end of the extension $a$, which head or cap by an overlapping flange portion $a^4$ acts also to retain the sleeve $a^2$. The head or cap $a^3$ is threaded to it and cylinder $a^5$, which is placed inside the steam-chamber when the cap is screwed on. The relative size of the cylinder $a^5$ is such that between it and the wall of the casing forming the steam-chamber there will be an annular recess into which steam may enter after it has entered through the steam-inlet $a^6$ into that portion of the steam-chamber below the end of the said cylinder when in place.

B is the piston fitting within the cylinder $a^5$. The piston has two piston-rods $b\ b'$. The piston-rod $b$ extends upwardly through the head or cap $a^3$ to join with the arm $a^7$ of the pencil-movement through the pivoted link $a^8$ and the swivel-coupling $a^9$, by which the piston-rod may be turned independently of the link $a^8$. The coupling $a^9$, it is to be noted, preferably, is made to screw into the end of the piston-rod, interiorly threaded to receive it. The piston-rod $b'$ on the other side passes down through the steam-chamber and through its head $a^{10}$ to connect with the spring C, at the inner end of said spring, and which connection is obtained by a coupling D. The head $a^{10}$ screws onto the butt-end of the casing A, internally threaded to receive it, and the head acts not only to form a portion of the wall of the steam-chamber, but to close it also from the spring. The spring C is further retained in the following manner: There depend from the lower end of the cylinder-casing A rods $a^{11}$, to the ends of which is bolted the plate or fixture $a^{12}$. There may be as many of these rods as is necessary for the further retention of said plate $a^{12}$. Into this plate there is threaded a hollow thumb-screw E, which is the adjusting-screw by which the adjustment of the arm of the pencil-movement is primarily obtained. Upon the end of this screw, projecting through the plate or fixture $a^{12}$, there is fitted a threaded nut $c$, to which the lower end of the spring C is fastened. The nut $c$ is screwed down against a shoulder $e$ on said screw E, by which it becomes fixed thereto so as to turn and be adjusted therewith, as will hereinafter be described. On the thread of the screw E, between its head and the plate or fixture $a^{12}$, there is fitted a locking-nut E', which is adapted to bear against said plate for holding said screw against turning.

The adjustment of the arm $a^7$ is effected simply by loosening the locking-nut E' and then turning the holding and thumb adjusting screw E to the right or left. The operation effecting such adjustment is that when the locking-nut E' is loosened then the screw E may be turned, and thereby be adjusted up or down with respect to the plate or fixture $a^{12}$, in which it is threaded and by which movement the spring-nut c, fixed to the end of the screw, is turned and adjusted vertically with it, which turns and vertically adjusts the spring, likewise the piston-rods b b', all of which turn and are adjusted together, for it will be observed that the coupling D joining the piston-rod to the spring is such that they will turn or be adjusted to move vertically together. Connection between the holding and thumb adjusting screw E and the pencil-arm, by which its adjustment is effected, is completed by the pivoted link $a^8$, joined at one end to the end of the piston-rod b by the swivel-coupling $a^9$ and by its other end connecting with the pencil-arm, and it is to be observed that by means of this swivel-coupling the rotary motion of the adjusting-screw E and the connecting intermediate parts becomes lost, the link merely receiving the vertical movement of the thumb-screw and connecting parts, which it communicates direct to and for the adjustment of the arm of the pencil-movement. In this manner the adjustment of the arm of the pencil-movement is effected, after which the holding and adjusting thumb-screw E is locked in place and all the intermediate connecting parts held in their proper operative position by the locking-nut E', turned up to lock in against the plate $a^{12}$, as before described.

In the method above described for effecting the adjustment of the arm of the pencil-movement the arrangement is such that parts performing other functions are utilized for this purpose of adjustment, thereby doing away with any auxiliary or unnecessary parts for such purpose and helping make the indicator as simple as possible in its construction. The thumb adjusting-screw E is removed entirely away from the steam-chamber, so as not to become heated and, moreover, it is such that it can be turned and the adjustment made entirely by hand without the use of a wrench or auxiliary tool. It is mechanically evident that this method of adjustment may be varied in many details without departing from the spirit of my invention—as, for example, in the disposition of the swivel joint or coupling. I prefer, however, to have its disposition in the manner shown.

As has already been stated in the preamble to the specification, the indicator is provided with an improved coupling for joining the spring to the piston-rod. This coupling is shown in the drawings and previously designated as D. It is very essential to the proper working of a steam-indicator that the spring should be coupled to the piston-rod by an adjusted connection not too tight upon the spring nor, for that matter, too loose, but by one effected by an adjustment such as an expert alone can make. The form of coupling heretofore in use has necessitated that the adjusted connection between the spring and the piston-rod be effected at the time of, or rather after they were coupled together—this inasmuch as the end of the piston-rod formed one of the bearings against the spring by which its adjusted connection with the piston-rod was effected. The difficulty has been, therefore, that when the spring was removed from the indicator, as was often done, and a new one inserted, this was done by some engineer inexperienced in such matters, with the result that the connection between the piston-rod was by an adjustment too tight or too loose, and so the indicator failed to act properly, when, in fact, there was no fault in its construction. By my improved form of coupling D this trouble is entirely eradicated, the coupling being formed with such means that the spring may first be adjustably connected to it independently of the piston-rod and then the coupling by a separate connection be fixed to the piston-rod. The resulting benefit is that a proper connection of the spring and coupling may be effected by an expert or one experienced before the spring is sent out from the factory, and all that is left for the buyer or his engineer to do is to fix the coupling on the piston-rod without the need of any adjustment whatever with respect to the spring.

Before referring to the construction of the coupling D it will be observed that the spring C is of the usual double-coil variety having the end bar $c'$, on which is an operating-bearing $c^2$, by which the spring is coupled to the end of the piston-rod.

Referring now to the construction of the coupling D, which can best be seen by reference to Fig. 2, the coupling consists of a main body piece or member d, made annular in form by a hole passing longitudinally through it, the wall of which hole is threaded. One end of the member is made cleft for some considerable extent to receive between its divided sides the bar $c'$ of the spring, which bar is inserted well up into the member and so disposed that its ball or bearing $c^2$ will come within the hole which passes through it. Within the hollow in the member d and disposed on either side of the ball or bearing $c^2$ of the spring when placed therein are the holding and adjusting screws $d'$ $d^2$. These screws, as shown, are inserted from opposite ends of the member $d$ and are screwed down where they will engage with the ball or bearing $c^2$ of the spring and so act to hold the same clamped between them, whereby the spring is joined to the coupling. The adjusting-screw $d'$ is made very short in order that when inserted into the hole in the member $d$ to engage with the ball or bearing $c^2$ of the spring there may be left ample space above its head by which the coupling may be screwed onto the end of the piston-rod, which connection is obtained by having formed on the end of the piston-rod a threaded stem $b^2$, which fits into the end of the threaded hole in the member $d$ above and away from its adjusting-screw $d'$. It will be observed now that before the spring is connected with the end of the piston by the screwing on of the coupling by turning the adjusting-screws in one direction or the other the ball or bearing of the spring clamped between them may be retained at any point of adjusted position with respect to the coupling or, more essentially, in a position where it will have no engagement with the coupling other than that of its ball held between the adjusting-screws. It will also be observed that before the spring is coupled to the end of the piston-rod it may be properly adjusted with respect to the coupling, and then after its adjustment has been effected all that remains to be done is to screw the coupling into the stem formed on the end of the piston-rod, as described above.

In the operation of the indicator, as above described, steam entering through the inlet-passage $a^6$ below the piston forces it to move upward, thereby through its connections acting to draw out the spring C and raise the arm $a^7$ of the pencil-movement. Both of these actions are desirable in an indicator, inasmuch as more accurate results can be obtained by drawing out the spring than by compressing it, as is done in many forms of steam-indicators. Then again the action of moving the pencil-arm upward permits of the paper on the drum being disposed normally or in an upright position as contrasted with some indicators where the paper is inverted on the drum consequent upon the arm of the pencil-movement being drawn down by the action of the piston. Then again the fact that my present indicator has embodied in it the feature of the spring entirely retained outside of the steam-chamber, where it will not be influenced by the heat of the steam, but exposed on all sides to the air, is also to be noted.

The fact that the parts of the indicator can be easily taken apart or put together is self-evident. Special attention has also been paid to a construction of the indicator permitting of any part thereof being taken out or removed without disturbing the rest. That this may be done is also self-evident without further explanation, especially that the spring may be taken out without opening the steam-chamber, removing the piston, or disturbing the pencil-movement.

Having thus fully described my invention, I claim and desire to secure by Letters Patent of the United States—

1. In a steam-engine indicator, in combination with a pencil-movement and a spring, a steam-chamber interposed between the same, a piston contained therein, a spring outside said steam-chamber, a piston-rod connecting with the inner end of said spring, and means for retaining the outer end of said spring.

2. In a steam-engine indicator, in combination with a pencil-movement and a spring, a steam-chamber interposed between the same, a piston contained therein, a piston-rod connecting said piston with the inner end of said spring, and means for retaining the outer end of said spring, whereby it may be drawn out.

3. In a steam-engine indicator, in combination with a pencil-movement and a spring, a steam-chamber interposed between the same, which chamber has a steam-inlet therein and the end of which chamber is closed from said spring, a piston, contained inside said steam-chamber and connecting through the closed end of the same with said spring, which piston is located within said steam-chamber on the side of its said steam-inlet removed from said spring, and means for retaining said spring whereby it may be drawn out.

4. In a steam-engine indicator, in combination with a pencil-movement and a spring, a steam-chamber interposed between the same, the casing of which chamber has a steam-inlet therein and a head at one end thereof closing said chamber from said spring, a removable cylinder inside said steam-chamber, a piston within said cylinder, piston-rods or like means extending from both ends of said piston, one of which rods extends to connect with said pencil-movement and the other of which rods extends through the closed end of said steam-chamber to connect outside the same with the inner end of said spring, means for effecting such connection, and means removed from said steam-chamber, the head or casing thereof for holding or retaining the outer end of said spring.

5. In a steam-engine indicator, in combination with a pencil-movement and a spring, a steam-chamber interposed between the same, the wall or casing of which chamber has a steam-inlet therein and a removable head at either end thereof, one of which heads closes the steam-chamber from said spring, a cylinder inside said steam-chamber fixed to one of said removable heads, a piston within said cylinder, piston-rods or like means extending through either end of said cylinder, one of which rods extends to connect with said pencil-movement and the other of which rods extends through the closed head of the steam-chamber to connect outside the same with the inner end of said spring, and means for holding or retaining the outer end of said spring whereby it may be drawn out.

6. In a steam-engine indicator, in combination with a pencil-movement and a spring, a steam-chamber interposed between the same, a piston contained therein, a piston-rod connecting with the inner end of said spring, and means for adjustably retaining the outer end of said spring.

7. In a steam-engine indicator, the combination with a pencil-movement and a spring of a steam-chamber interposed between the same, a piston contained within the steam-chamber, means connecting said piston and pencil-movement, means connecting said piston with the inner end of said spring, and adjustable means for retaining the outer end of said spring by which means also the adjustment of said pencil-movement may be obtained.

8. In a steam-engine indicator, in combination with a pencil-movement and a spring, a steam-chamber arranged between the same and having an end closed from said spring, a piston contained in said steam-chamber, piston-rods or other connections extending from both ends of said piston, one extending to connect with the pencil-movement and the other extending to connect with the inner end of said spring, and means for adjustably retaining the outer end of said spring, by which means also adjustment of the pencil-movement may be obtained through said spring, piston and piston-rods, all of which form a chain of connection between said adjustable means and the pencil-movement.

9. In a steam-engine indicator, the combination with a pencil-movement and a spring of a steam-chamber interposed between the same and having an end closed from said spring, a piston contained in said steam-chamber and connecting with said pencil-movement, a piston-rod extending through the closed end of said steam-chamber and coupling onto the inner end of said spring, a fixture of support arranged beyond the outer end of said spring, and means carried thereby for holding said spring for effecting also the adjustment of said pencil-movement.

10. In a steam-engine indicator, the combination with a pencil-movement and a spring of a steam-chamber between the same and having an end closed from said spring, a piston contained in said steam-chamber, means connecting said piston with said pencil-movement, a piston-rod or like means extending through said closed end of the steam-chamber and coupling onto the inner end of said spring, all of which means form a chain of connection between said spring and said pencil-movement, a fixture of support arranged beyond the outer end of said spring, an adjustable screw arranged in said fixture of support, and a nut on the end of said spring connecting therewith.

11. In a steam-engine indicator, the combination with a pencil-movement and a spring of a steam-chamber having an end closed from said spring, a piston contained in said steam-chamber, means connecting said piston with said pencil-movement, a piston-rod or like means connecting said piston with the inner end of said spring outside the steam-chamber, all of which means form a chain of connection between said spring and said pencil-movement, a swivel-joint formed at some point in said chain of connection, a fixture of support arranged beyond the outer end of said spring, an adjusting-screw threaded therein, and means on the end of said spring combining with said adjusting-screw projecting through said fixture of support.

12. In a steam-indicator, in combination with a pencil-movement and a spring, a steam-chamber arranged between the same having an end closed from said spring, a piston contained in said steam-chamber, piston-rods extending from both sides of said piston, link means making at one end swivel connection with one of said piston-rods and at the other end connection with said pencil-movement, means extending through the closed end of the steam-chamber and connecting the other of the piston-rods with said spring, a plate or fixture of support beyond the other end of said spring, rods depending from the casing of said steam-chamber for retaining said plate, an adjusting-screw threaded therein, a nut to which the end of said spring is fixed threaded upon the end of said adjusting-screw to turn therewith, and a locking-nut arranged upon said screw.

13. As a separate article of manufacture, a coupling or device for connecting the piston-rod of a steam-engine indicator with its spring, said coupling being adapted in part to fasten onto said piston-rod, and opposing members carried by and forming a part of said coupling independent of said piston-rod, for receiving and clamping between them a portion of said spring.

14. As a separate article of manufacture, a coupling or device for connecting the piston-rod of a steam-engine indicator with its spring, said coupling being adapted in part to fasten onto said piston-rod, and reversely-adjustable members carried by and forming a part of said coupling independent of said piston-rod, for receiving and clamping between them a portion of said spring.

15. As a separate article of manufacture, a coupling or device for connecting the piston-rod of a steam-engine indicator with its spring, said coupling being adapted in part to fasten onto said piston-rod, and having also a threaded hole, and reversely-adjustable screw members arranged in said hole independent of said piston-rod, for receiving and clamping between them a portion of said spring.

16. As an article of manufacture, a coupling for connecting the piston-rod in a steam-engine indicator to its spring, said coupling having a threaded hole by which it may be joined to said piston-rod and made cleft in part by which it may receive a portion of said spring, and reversely-adjustable screw members contained in said threaded hole independent of said piston-rod, for receiving and clamping between them said portion of the spring.

CHARLES B. BOSWORTH.

In presence of—
J. M. DOLAN,
M. V. FOLEY.